Jan. 19, 1932. W. S. EATON 1,842,347
METHOD AND APPARATUS FOR DETERMINING DIRECTION
Original Filed Feb. 23, 1928
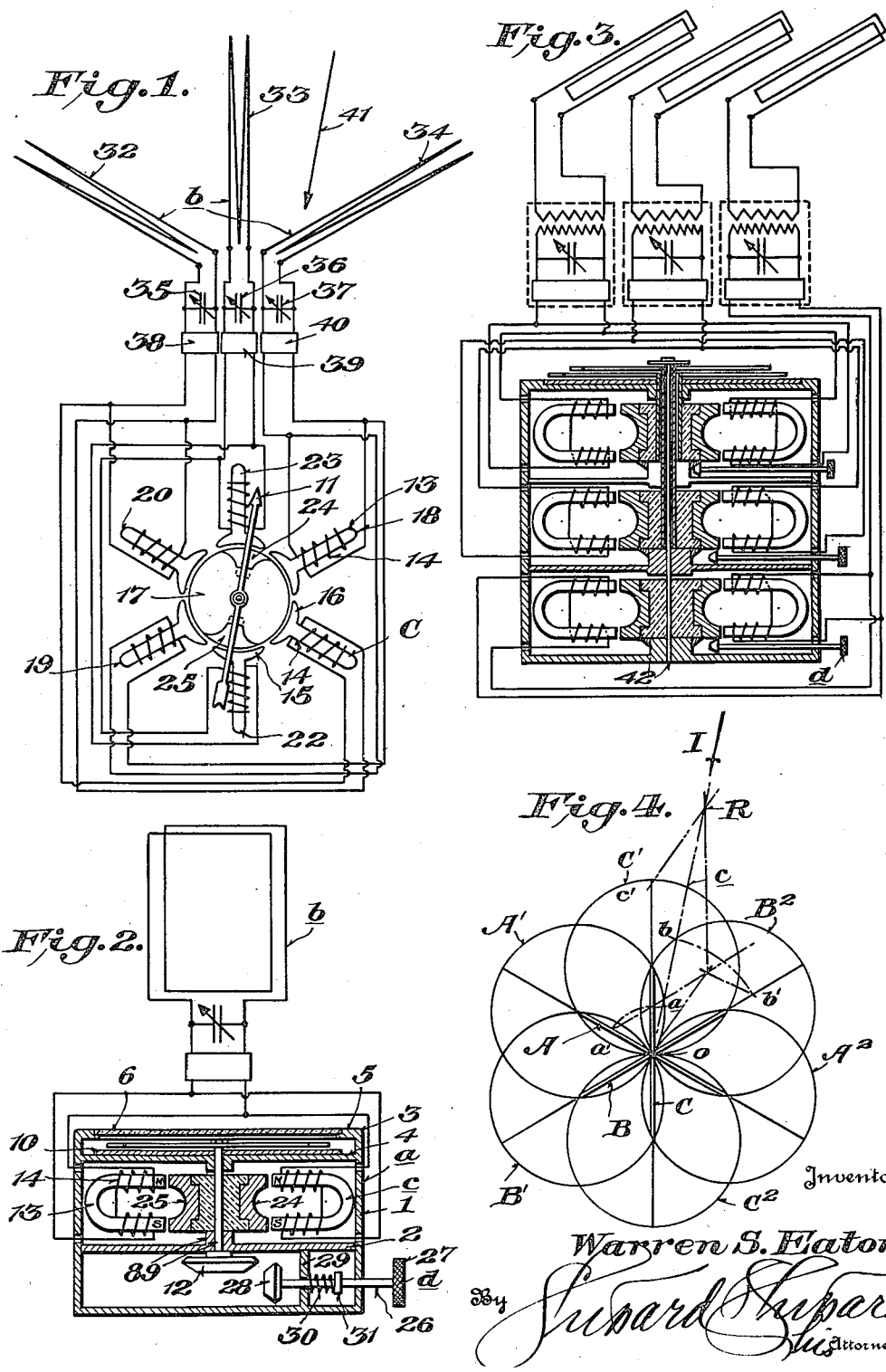
Inventor
Warren S. Eaton,
By Shepard Shepard
his Attorneys Patented Jan. 19, 1932

1,842,347

UNITED STATES PATENT OFFICE

WARREN S. EATON, OF LOS ANGELES, CALIFORNIA, ASSIGNOR TO EATON RADIO INSTRUMENT CORPORATION, OF LOS ANGELES, CALIFORNIA, A CORPORATION OF CALIFORNIA

METHOD AND APPARATUS FOR DETERMINING DIRECTION

Original application filed February 23, 1928, Serial No. 256,228. Divided and this application filed July 31, 1931. Serial No. 554,307, and in Germany July 23, 1929.

Application filed in Germany, July 23, 1929.

This invention relates to radio direction indication, and has for its object to provide for utilizing the energy received from a broadcast station to automatically and visually indicate and register the line of direction between the broadcast station and the point of reception of the energy.

According to my invention, I utilize the received energy to produce fields of force having predetermined directional relation with respect to the line of direction between the point of reception and the source of the broadcast energy, and then these fields of force are employed to automatically actuate indicating mechanism to visually indicate said line of direction.

This application is a division of my co-pending application, Serial No. 256,228, filed February 23, 1928, for method and apparatus for determining position, wherein the underlying principles of the present invention are disclosed and claimed for the purpose of indicating the position of an unknown point with respect to a plurality of broadcast stations. Said application 256,228 is, in turn, a continuation in part of my application 224,997, filed October 8, 1927.

With the above and other objects in view, the invention consists in the novel and useful provision, formation and relative arrangement of parts, members and features as well as the method of use of the invention, all as disclosed in certain embodiments in the accompanying drawings, described generally and more particularly pointed out in the claims.

In the drawings:

Figure 1 is a diagrammatic view illustrating a circuit which may be utilized in practicing my invention;

Figure 2 is a cross sectional view of certain of the apparatus utilizing the circuits shown in Figure 1;

Figure 3 is a wiring diagram, certain elements of the invention being shown in section, being a modification of the form of the invention shown in Figures 1 and 2; and Figure 4 is a diagram which will be used to describe the theory upon which this compass operates.

Before entering into a description of the details of the invention, it might be well to explain briefly the theory upon which this radio direction indicating system operates. It is commonly known in the art that the intensity of the signal received or the current set up in a receiving set equipped with a loop or so-called directional antenna will be a maximum when the loop is in direct alignment with the carrier wave and that this intensity will have a minimum value when the loop is normal or at right angles to the direction of the carrier wave.

When a loop antenna of the class above described is rotated about its axis and the electro-motive force induced in the loop is plotted in a polar diagram against the angular position of the loop, the resultant curve will be the "figure 8" which is known as the bilateral characteristic curve of a loop.

For a given loop, therefore, the intensity of an induced current resulting from a radio wave approaching the loop at a given angle will be proportional to the distance from the center of the loop to the point at which the directional line from the transmitter to the center of the loop cuts the bilateral characteristic curve.

If a series of loops are arranged in fixed angular relation with each other as indicated at A, B and C in Figure 4, the bilateral characteristic curves of these loops will be as indicated at $A^1$, $A^2$, $B^1$, $B^2$, and $C^1$, $C^2$ respectively.

Assuming that an incoming wave I is approaching the common center $o$ of the three coils, the induced current in the loop A will be proportional to the vector $ao$, that in loop B will be proportional to $bo$, and that induced in loop C will be proportional to $co$.

These electric "force" vectors may be resolved into the line of their respective coils as indicated at $a'o$, $b'c$ and $c'o$ respectively, and a final resolution of the forces may be made giving the common resultant $Ro$ which lies along the direction line of the incoming wave I.

If the resolution of forces described above is considered as taking place in a series of electro-static or electro-magnetic field pieces, which are arranged in oppositely disposed pairs or sets in substantial parallelism with the three directional antennæ, it will be apparent that the resultant force Ro may be employed to swing a suitable flux-carrying member into exact alignment with the incoming wave.

From the foregoing general explanation, it will be understood that the underlying principle of the present invention is the utilization of the received energy to create fields of force the effect of which has predetermined directional relation to the source of the received energy, and then the utilization of the effect of said fields of force to indicate and register the line of direction between the source and the point of reception of the broadcast energy. This basic principle is claimed in the present application. In my application, Serial No. 355,015, filed April 15, 1929, I have claimed another aspect of this same underlying principle, while in my applications, Serial No. 224,997, filed October 8, 1927, and Serial No. 256,228, filed February 23, 1928, I have disclosed and claimed the use of this underlying principle for accomplishing other results.

It might be mentioned at this time that it is preferable to use three or more antenna loops (three being the preferred number) for, although two loops arranged substantially at right angles with each other will produce a resultant field, it will be readily apparent that with only two loops the flux-carrying member will be rotated into any one of the four quadrants and, therefore, not indicate true direction.

In Figs. 1 and 2, I have shown a direction indicator $a$ which operates in conjunction with two or more aerials or antennæ $b$. The direction indicator $a$ includes a casing 1 provided with a sub-base 2 and with a cap 3. The cap 3 may be held to the casing in any suitable manner and the same includes a plate 4 formed with a flange 5, the said flange being adapted to receive a transparent covering plate 6. The member 4 is provided with a central enlargement 7 as is likewise the sub-base 2, as shown at 8, and the said enlargements 7 and 8 are centrally bored to receive a shaft 9 passed therethrough. An indicator scale 10 is secured to the member 4, and an indicator 11 is secured to one end of the shaft. The opposite end of the shaft 9 carries a friction cone 12. Included between the member 4 and the sub-base 2 is means $c$ adapted to influence movement of the pointer in its play over the scale. This means forms a part of the direction indicator $a$, and includes a series of field pieces 13 arranged in angular relation, as shown in Figure 1. This angular relation will depend to a certain extent upon the antenna $b$, as will appear more fully. Wound on said field pieces are wire coils 14 and the polarity of said field pieces will depend upon the direction of flow of electricity through said wire coils. The field pieces are shown in horse-shoe form with the ends enlarged, as shown at 15, and curved at 16. Secured to the shaft 9 is a non-magnetic flux-carrying member 17 and which member 17 in the present instance is substantially circular and lies between the enlarged ends 15 of the several field pieces. It will be noted, upon referring to Fig. 1, that I have arranged the number of field pieces substantially 60° apart, although other angular relations may be utilized depending on condition and service. The field pieces 13, shown at 18 and 19, are related, as are likewise the field pieces 20 and 21 and field pieces 22 and 23. In other words, oppositely aligned field pieces are related. Secured to the member 17 and diametrically oppositely arranged are pole pieces 24 and 25. Said pole pieces are slightly spaced from the heads of each field piece and bridge the gap between the upper and lower enlarged heads of the field pieces, as best illustrated in Figure 2.

In Figure 1, I have shown three separate antennæ $b$, at 32, 33 and 34. Each antenna is substantially a loop or coil of wire of standard form arranged in certain angular relation and it will be noted that the antenna 32 substantially parallels the field pieces 20 and 21 as do likewise the antennæ 33, 34 relative to the field pieces 22 and 23, and 18 and 19 respectively. I have not shown any particular apparatus for either receiving, tuning, or amplifying the broadcast wave, although I have shown capacities at 35, 36 and 37, and amplifying means at 38, 39 and 40. The different antennæ would be associated with the different capacities and with the different amplifying units and it is intended that the amplification for all of the units should be uniform. As shown in my applications, Serial Nos. 224,997, 256,228, 348,031, and 355,015, the carrier wave strength received from a given broadcast station by the directional antennæ $b$ varies in amount with the angular displacement of each individual antenna relative to the sending station indicated by the arrow 41. As the carrier wave strength varies in the antennæ units, so also will the effect of the strength of said carrier wave vary in the electrically connected coils mounted on the respective field pieces. Each pair of oppositely disposed pole pieces are connected in series so that like poles are diametrically opposite, i. e., north poles facing north poles, and south poles facing south poles, as shown in Figure 2. Inasmuch as the members of each pair of pole pieces are energized from the same antenna the fields of force generated thereby are equal and disposed diametrically opposite one another, but of course different in strength from that of the fields generated by each of the other pairs of pole pieces. The effect of the several different pairs of fields of force is that of two diametrically opposite fields of force lying in predetermined directional relation with respect to the direction of the incoming carrier wave, and this effect acting upon the pole pieces 24 and 25 of the rotor 17 will cause the latter to turn until its pole pieces 24 and 25 are balanced by said resultant field effects, whereby the indicator 11 will lie in the line of direction of the incoming carrier wave.

When the general direction of the transmitting station is not known, it will not be apparent to the operator whether the arrow end of the indicator is pointing toward or away from the station. This fact can be readily determined by introducing the earth capacity into one side of the receiving set input in the well known manner, the introduction of this capacity on the side away from the station will be effective to substantially "cut out" the incoming signal according to the well known "cardioid effect".

When the direction to the broadcast station has thus been determined, if the arrow end of the indicator 11 is not indicating the direction to the broadcast station, but is indicating a direction 180° therefrom, it may be manually turned 180° to indicate the direction of the station, where it will be held by the fields of force created by the energy received from said station. Means for accomplishing this result have been shown in Figure 2 and comprises the means $d$ including a shaft 26 carrying a finger piece 27 at one end and a cone 28 at the other end. This means is secured within the casing by having the shaft thereof pass through the side wall and a partition wall 29 of the casing and the said cone is normally urged from the friction cone 12 through the medium of a coil spring 30 surrounding the shaft and bearing at one end against the partition wall and at the opposite end against the collar 31 carried by the shaft.

This unidirectional feature as disclosed in this application and also in my applications, Serial No. 224,997, filed October 8, 1927 and Serial No. 256,228, filed February 23, 1928, is not claimed herein, but is claimed in my application, Serial No. 355,015, filed April 15, 1929.

The basic principle of the utilization of fields of force for actuating an indicator to indicate the line of direction to the broadcast station, as shown and described in this application, and also in Serial No. 224,997, is claimed in this application.

The form of the device shown in Fig. 3 permits tuning for any desired number of stations to the end that angular bearings may be taken relative to said several stations. This form of the invention consists in providing a plurality of the devices shown in Figures 1 and 2, one mounted above the other with suitable shielding means therebetween. Furthermore, I provide independent antennæ coils for each device, the antennæ coils following the same principle as just described for Figures 1 and 2. With this form of the invention, it is possible to tune to three independent broadcast stations and the indicator for each device would point toward its respective station in accordance with the principle as enunciated for that form of the invention shown in Figures 1 and 2.

If that form of the invention shown in Figure 3 has been utilized the angular relation between the different broadcast stations will be indicated by the several indicators of said device, and the position of any vehicle carrying said device may be accurately determined and likewise its distance from the broadcast stations calculated when the distances between the broadcast stations are known, as fully set forth and claimed in my copending application, Serial No. 256,228, filed February 23, 1928.

It is well known to those familiar with the art that in either an electro-static or an electro-magnetic field the feature of attraction and repulsion between surfaces or poles of unlike and like sign may be employed to produce movement to a "rotor" or flux-carrying member, and therefore it will be understood that the present invention contemplates not only the use of electro-magnetic fields of force but also electro-static fields of force, such for instance as disclosed and claimed specifically in my copending application, Serial No. 348,031, filed March 18, 1929, for radiodynamic orientation means and method.

While the present invention is based on direction indication, and it has been described that the indicator needle will swing into the line of direction to the source of the received energy, it will of course be understood that this will occur only when the indicator needle is in a horizontal position. However, the indicator needle will always turn to the same position on the dial when indicating the same line of direction, regardless of the position of the instrument, and therefore when the face of the instrument is not disposed horizontally, as when the instrument is mounted on an instrument board, it should be arranged so that the needle will be in an upright position when the vehicle is heated along the line of direction indicated by the indicator needle of the instrument.

I claim:

1. An apparatus for indicating the direction between a point and a source of radio energy embodying a plurality of angularly disposed directional antennæ, tuning and amplifying means in operative relation with said antennæ, a plurality of diametrically disposed sets of electro-magnetic field pieces arranged in predetermined angular relation with said antennæ, a rotatable flux-carrying member disposed between the pole faces of said field pieces, indicating means in operative relation with said flux-carrying member, and means for electrically connecting each set of field pieces, through said tuning and amplifying means with one of said antennæ said field piece members being U-shaped and arranged with like poles diametrically opposed.

2. An apparatus for indicating the direction between a point and a source of radio energy embodying a plurality of angularly disposed directional antennæ, tuning and amplifying means in operative relation with said antennæ, a plurality of diametrically disposed sets of electro-magnetic field pieces arranged in predetermined angular relation with said antennæ, a rotatable flux-carrying member disposed between the pole faces of said field pieces, indicating means in operative relation with said flux-carrying member, and means for electrically connecting each set of field pieces through said tuning and amplifying means with one of said antennæ, said field piece members being U-shaped and arranged with like poles diametrically opposed, said flux-carrying member being shaped to equalize the air gap density between the poles of said field members.

3. An apparatus for indicating the direction between a point and a source of radio energy embodying a plurality of angularly disposed directional antennæ, tuning and amplifying means in operative relation with said antennæ, a plurality of diametrically disposed sets of electro-magnetic field pieces arranged in predetermined angular relation with said antennæ, a rotatable flux-carrying member disposed between the pole faces of said field pieces, direction indicating means in operative relation with said flux-carrying member, mechanical means for imparting rotative adjustment to said indicating means, and means for electrically connecting each set of field pieces through said tuning and amplifying means with one of said antennæ.

4. An apparatus for indicating the direction between a point and a source of radio energy embodying a plurality of angularly disposed directional antennæ, a plurality of diametrically disposed sets of electro-magnetic field pieces arranged in predetermined angular relation with said antennæ, tuning and amplifying means operatively connecting said directional antennæ with their relatively parallel field pieces to magnetically energize said field pieces, an unmagnetized flux-carrying member rotatably mounted between the pole faces of said field pieces, and indicating means in operative relation with said flux-carrying member.

5. An apparatus for indicating the direction between a point and a source of radio energy embodying a plurality of angularly disposed directional antennæ, a plurality of diametrically disposed sets of electro-magnetic field pieces arranged in predetermined angular relation with said antennæ, tuning and amplifying means operatively connecting said directional antennæ and said field pieces to magnetically energize said field pieces proportionately with the radio current induced in the corresponding antennæ, an unmagnetized flux-carrying member rotatably mounted between the pole faces of said field pieces, and indicating means in operative relation with said flux-carrying member, said field pieces being U-shaped and said flux-carrying member being constructed to equalize the air gap density between the pole faces on said field pieces.

6. An indicator unit for use in combination with a radio-dynamic system for determining direction embodying a plurality of diametrically disposed U-shaped electromagnetic field pieces, arranged to provide a substantially circular area between the pole faces thereof, and a flux-carrying member rotatably mounted in said area.

7. An indicator unit for use in combination with a radio-dynamic system for determining direction embodying, a pluralty of diametrically disposed U-shaped electromagnetic field pieces, arranged to provide a substantially circular area between the pole faces thereof, and a flux-carrying member rotatably mounted in said area, said field pieces and flux-carrying member being relatively disposed to establish a magnetic field in which the lines of force are at right angles to the direction of rotation of said flux-carrying member.

8. An indicator unit for use in combination with a radio-dynamic system for determining direction, embodying a plurality of diametrically disposed U-shaped electromagnetic field pieces, arranged to provide a substantially circular area between the pole faces thereof, and a flux-carrying member rotatably mounted in said area, said field pieces being electrically connected in sets so that like pole faces are diametrically opposite.

9. An indicator unit for use in combination with a radio-dynamic system for determining direction, embodying a plurality of diametrically disposed U-shaped electromagnetic field pieces, arranged to provide a substantially circular area between the pole faces thereof, and a flux-carrying member rotatably mounted in said area, said flux-carrying member being constructed to provide paths of equal permeability between the unlike pole faces of the pieces to stop the rotation of the flux-carrying member when said flux-carrying member rotates into the resultant magnetic field of the field pieces.

10. An electrically controlled system for indicating the direction from a point to a source of radio energy, embodying a plurality of angularly disposed directional antennæ, a plurality of field pieces connected with and arranged in predetermined angular relation with said antennæ, a flux-carrying member rotatably disposed between said field pieces, and direction indicating means associated with said flux-carrying member.

11. An electrically controlled system for indicating the direction between a point and a source of radio energy, embodying a plurality of angularly disposed directional antennæ, a plurality of field pieces arranged in predetermined angular relation with said antennæ, a flux-carrying member rotatably disposed between said field pieces, direction indicating means in operative relation with said flux-carrying member, and means connecting said field pieces and their respective antennæ for energizing said field pieces proportionate to a current induced in the respective antennæ with which said field pieces are parallel.

12. An electrically controlled system for indicating the direction between a point and a source of radio energy embodying a plurality of angularly disposed directional antennæ, a plurality of field pieces connected to and arranged in predetermined angular relation with said antennæ, a rotatable flux-carrying member disposed between said field pieces, direction indicating means in operative relation with said flux-carrying member, and tuning and amplifying means included in said connection between said field pieces and said antennæ for delivering electrical energy to said field pieces.

13. An electrically controlled system for indicating the direction between a point and a source of radio energy embodying a plurality of angularly disposed directional antennæ, a plurality of field pieces connected to and arranged in predetermined angular relation with said antennæ, a flux-carrying member rotatably disposed between said field pieces, and direction indicating means in operative relation with said flux-carrying member, said flux-carrying member being constructed to vary the air gap density between the field pieces proportionately with the receiving characteristics of the directional antennæ with which the respective field pieces are associated.

14. An electrically controlled system for indicating the direction between a point and a source of radio energy embodying a plurality of angularly disposed directional antennæ, a plurality of sets of field pieces connected to and arranged in predetermined angular relation with said antennæ, a flux-carrying member rotatably disposed between said field pieces, and direction indicating means in operative relation with said flux-carrying member, said flux-carrying member being constructed to vary the air gap density between relative sets of field pieces substantially in accordance with a cosine curve.

15. An electrically controlled system for indicating the direction between a point and a source of radio energy embodying a plurality of angularly disposed directional antennæ, tuning and amplifying means connected with said antennæ, a plurality of field pieces arranged in predetermined angular relation with said antennæ, means for electrically energizing said field pieces from said tuning and amplifying means, a rotatable flux-carrying member interposed between said field pieces, said flux-carrying member being constructed to vary the air gap density between the field pieces proportionately with the receiving characteristics of the directional antennæ with which said field pieces are associated and to compensate for the characteristics of the tuning and amplifying means, and direction indicating means in operative relation with said flux-carrying member.

16. An electrically controlled system for indicating direction between a point and a plurality of sources of radio energy embodying, a plurality of angularly disposed directional antennæ, tuning and amplifying means connected with said antennæ, a plurality of banks of field pieces, the individual field pieces of which are in predetermined angular relation with said antennæ, a rotatable flux-carrying member disposed in each bank of field pieces, indicating means in operative relation with each of said flux-carrying members, and means for electrically energizing each of said banks of field pieces from said tuning and amplifying means, said tuning and amplifying means being connected with the banks of field pieces to electrically energize each of said banks from a different source of radio energy.

17. A method of indicating the direction between a point and a source of electro-magnetic energy which includes receiving said electro-magnetic energy, generating by said received energy bidirectional fields of force, the effect of which is a single field of force bearing a predetermined relation to the direction between said point and said source, and utilizing solely and exclusively said single field effect to visually indicate the line of direction between said point and said source.

18. A method of indicating the direction from a point to a source of electro-magnetic energy which includes receiving said electromagnetic energy, generating by said received energy fields of force, the effect of which is a single field of force bearing a predetermined relation to the direction between said point and said source, utilizing solely and exclusively said single field effect to visually indicate the line of direction between said point and said source, introducing earth capacity into said received energy, and indicating the effect thereof upon the received energy which produces the field of force, whereby the direction of travel of the received energy along said line of direction is established.

19. A method of indicating the direction between a point and a source of electro-magnetic energy which includes, receiving said electro-magnetic energy, generating by said received energy fields of force having the effect of two fields of force each bearing a predetermined relation with the direction between the said point and the source of said electro-magnetic energy, and utilizing solely and exclusively said field effects to indicate said direction.

20. A method of indicating the direction between a point and a source of electro-magnetic energy which includes, receiving said electro-magnetic energy, generating by said received energy electro-magnetic fields of force having the effect of two fields of force, each bearing a predetermined relation with the direction between the said point and the source of said electro-magnetic energy, and utilizing solely and exclusively said field effects to indicate the said direction.

21. A method of indicating the direction between a point and a source of electro-magnetic energy which includes, directionally and simultaneously receiving said electro-magnetic energy separately in different amounts, generating by said received electro-magnetic energy separate electric currents, amplifying said currents, generating by said amplified currents fields of force having the effect of two fields of force each bearing a predetermined relation with the direction between the said point and the source of electro-magnetic energy, and utilizing solely and exclusively said field effects to indicate the said direction.

22. A method of indicating the direction between a point and a source of electro-magnetic energy which includes, directionally and simultaneously receiving said electro-magnetic energy separately in different amounts, amplifying said different amounts of energy, generating by said amplified energies fields of force having the effect of two fields of force each bearing a predetermined relation with the direction between the said point and the source of electro-magnetic energy, and utilizing solely and exclusively said field effects to indicate the said direction.

23. An apparatus for indicating the direction between a point and a source of electro-magnetic energy comprising means for receiving said electro-magnetic energy, means for generating by said received energy fields of force having the effect of two fields of force each bearing a predetermined relation with the direction between the said point and the source of said electro-magnetic energy, and means including a flux-carrying member actuated solely by said field effects to indicate the said direction.

24. An apparatus for indicating the direction between a point and a source of electro-magnetic energy comprising means for receiving said electro-magnetic energy, means for generating by said received energy fields of force having the effect of two fields of force each bearing a predetermined relation with the direction between the said point and the source of said electro-magnetic energy, and means including a flux-carrying member actuated solely by said field effects to visually indicate the said direction.

25. An apparatus for indicating the direction between a point and a source of electro-magnetic energy comprising means for receiving said electro-magnetic energy, means for generating by said received energy fields of force having the effect of two fields of force each bearing a predetermined relation with the direction between the said point and the source of said electro-magnetic energy, and means including a flux-carrying member for utilizing said field effects to visually indicate the direction between said point and said source, said flux-carrying member and fields of force being mutually associated so that said fields of force act directly and independently upon the flux-carrying member to actuate the same to indicate the said direction.

26. An apparatus for indicating the direction between a point and a source of electro-magnetic energy which includes, means for directionally and simultaneously receiving said electro-magnetic energy separately in different amounts, means for generating by said received electro-magnetic energy separate electric currents, means for amplifying said currents, means for generating by said amplified currents fields of force having the effect of two fields of force each bearing a predetermined relation with the direction between the said point and said source, and means for utilizing solely and exclusively said field effects to move a flux-carrying member to indicate the said direction.

27. An apparatus for indicating the direction between a point and a source of electro-magnetic energy which includes, means for directionally and simultaneously receiving said electro-magnetic energy separately in different amounts, means for amplifying said different amounts of energy, means for generating by said amplified energies fields of force having the effect of two fields of force each bearing a predetermined relation with the direction between the said point and said source, and means for utilizing solely and exclusively said field effects to move a flux-carrying member to indicate the said direction.

28. An electrically controlled system for indicating the direction from a point to a source of radio energy, embodying a plurality of angularly disposed directional antennæ, a plurality of electro-magnetic field pieces connected with and arranged in predetermined angular relation with said antennæ, a flux-carrying member rotatably disposed between said field pieces, and direction indicating means associated with said flux-carrying member.

29. An electrically controlled system for indicating the direction between a point and a source of radio energy, embodying a plurality of angularly disposed directional antennæ, a plurality of electro-magnetic field pieces arranged in predetermined angular relation with said antennæ, a flux-carrying member rotatably disposed between said field pieces, direction indicating means in operative relation with said flux-carrying member, and means connecting said field pieces and their respective antennæ for energizing said field pieces proportionate to a current induced in the respective antennæ with which said field pieces are parallel.

30. An electrically controlled system for indicating the direction between a point and a source of radio energy embodying a plurality of angularly disposed directional antennæ, a plurality of electro-magnetic field pieces connected to and arranged in predetermined angular relation and said antennæ, a rotatable flux-carrying member disposed between said field pieces, direction indicating means in operative relation with said flux-carrying member, and tuning and amplifying means included in said connection between said field pieces and said antennæ for delivering electrical energy to said field pieces.

31. An electrically controlled system for indicating the direction between a point and a source of radio energy embodying a plurality of angularly disposed directional antennæ, a plurality of sets of electro-magnetic field pieces connected to and arranged in predetermined angular relation with said antennæ, a flux-carrying member rotatably disposed between said field pieces, and direction indicating means in operative relation with said flux-carrying member, said flux-carrying member being constructed to vary the air gap density between relative sets of field pieces substantially in accordance with a cosine curve.

32. An electrically controlled system for indicating the direction between a point and a source of radio energy embodying a plurality of angularly disposed directional antennæ, tuning and amplifying means connected with said antennæ, a plurality of electro-magnetic field pieces arranged in predetermined angular relation with said antennæ, means for electrically energizing said field pieces from said tuning and amplifying means, a rotatable flux-carrying member interposed between said field pieces, said flux-carrying member being constructed to vary the air gap density between the field pieces proportionately with the receiving characteristics of the directional antennæ with which said field pieces are associated and the compensate for the characteristics of the tuning and amplifying means, and direction indicating means in operative relation with said flux-carrying member.

33. A method of indicating the direction between a point and a source of electro-magnetic energy which includes receiving said electro-magnetic energy, generating by said received energy bidirectional electro-magnetic fields of force, the effect of which is a single field of force bearing a predetermined relation to the direction between said point and said source, and utilizing solely and exclusively said single field effect to visually indicate the line of direction between said point and said source.

34. A method of indicating the direction from a point to a source of electro-magnetic energy which includes receiving said electro-magnetic energy, generating by said received energy electro-magnetic fields of force, the effect of which is a single field of force bearing a predetermined relation to the direction between said point and said source, utilizing solely and exclusively said single field effect to visually indicate the line of direction between said point and said source, introducing earth capacity into said received energy, and indicating the effect thereof upon the received energy which produces the field of force, whereby the direction of travel of the received energy along said line of direction is established.

35. A method of indicating the direction between a point and a source of electro-magnetic energy which includes, directionally and simultaneously receiving said electro-magnetic energy separately in different amounts, generating by said received electro-magnetic energy separate electric currents, amplifying said currents, generating by said amplified currents electro-magnetic fields of force having the effect of two fields of force each bearing a predetermined relation with the direction between the said point and the source of electro-magnetic energy, and utilizing solely and exclusively said field effects to indicate the said direction.

36. A method of indicating the direction between a point and a source of electro-magnetic energy which includes, directionally and simultaneously receiving said electro-magnetic energy separately in different amounts, amplifying said different amounts of energy, generating by said amplified energies electro-magnetic fields of force having the effect of two fields of force each bearing a predetermined relation with the direction between the said point and the source of electro-magnetic energy, and utilizing solely and exclusively said field effects to indicate the said direction.

37. An apparatus for indicating the direction between a point and a source of electro-magnetic energy comprising means for receiving said electro-magnetic energy, means for generating by said received energy electro-magnetic fields of force having the effect of two fields of force each bearing a predetermined relation with the direction between the said point and the source of said electro-magnetic energy, and means including a flux-carrying member actuated solely by said field effects to indicate the said direction.

38. An apparatus for indicating the direction between a point and a source of electro-magnetic energy comprising means for receiving said electro-magnetic energy, means for generating by said received energy electro-magnetic fields of force having the effect of two fields of force each bearing a predetermined relation with the direction between the said point and the source of said electro-magnetic energy, and means including a flux-carrying member actuated solely by said field effects to visually indicate the said direction.

39. An apparatus for indicating the direction between a point and a source of electro-magnetic energy comprising means for receiving said electro-magnetic energy, means for generating by said received energy electro-magnetic fields of force having the effect of two fields of force each bearing a predetermined relation with the direction between the said point and the source of said electro-magnetic energy, and means including a flux-carrying member for utilizing said field effects to visually indicate the direction between said point and said source, said flux-carrying member and fields of force being mutually associated so that said fields of force act directly and independently upon the flux-carrying member to actuate the same to indicate the said direction.

40. An apparatus for indicating the direction between a point and a source of electro-magnetic energy which includes, means for directionally and simultaneously receiving said electro-magnetic energy separately in different amounts, means for amplifying said different amounts of energy, means for generating by said amplified energies electro-magnetic fields of force having the effect of two fields of force each bearing a predetermined relation with the direction between the said point and said source, and means for utilizing solely and exclusively said field effects to move a flux-carrying member to indicate the said direction.

41. An indicator unit for use in combination with a radiodynamic system for determining direction, embodying a plurality of sets of diametrically disposed U-shaped field pieces, and a flux-carrying member rotatably mounted between the pole faces of said field pieces.

42. An indicator unit for use in combination with a radiodynamic system for determining direction, embodying a plurality of sets of diametrically disposed U-shaped field pieces, and a flux-carrying member rotatably mounted between the pole faces of said field pieces, said field pieces and flux-carrying member being relatively disposed so that the fields of force are at right angles to the direction of rotation of said flux-carrying member.

43. An indicator unit for use in combination with a radiodynamic system for determining direction, embodying a plurality of sets of diametrically disposed U-shaped field pieces, and a flux-carrying member rotatably mounted between the pole faces of said field pieces, and said field pieces being electrically connected in sets so that like polarity of the pole faces are diametrically opposite.

44. An indicator unit for use in combination with a radiodynamic system for determining direction, embodying a plurality of sets of diametrically disposed U-shaped field pieces, and a flux-carrying member rotatably mounted between the pole faces of said field pieces, and said flux-carrying member being constructed to provide paths of equal reluctance between the unlike pole faces of the field pieces to stop the rotation of the flux-carrying member when said flux-carrying member rotates into the resultant field of the field pieces.

WARREN S. EATON.